United States Patent
Savva

(10) Patent No.: US 8,255,893 B2
(45) Date of Patent: Aug. 28, 2012

(54) SOFTWARE MANAGEMENT PROCESS, SOFTWARE MANAGEMENT APPARATUS, AND COMPUTER-READABLE MEDIUM STORING SOFTWARE MANAGEMENT PROGRAM

(75) Inventor: Andreas Savva, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1272 days.

(21) Appl. No.: 11/790,661

(22) Filed: Apr. 26, 2007

(65) Prior Publication Data

US 2008/0059953 A1    Mar. 6, 2008

(30) Foreign Application Priority Data

Sep. 5, 2006 (JP) .................................. 2006-239746

(51) Int. Cl.
G06F 9/44 (2006.01)
G06F 9/445 (2006.01)
G06F 11/30 (2006.01)

(52) U.S. Cl. ........ 717/168; 717/121; 717/172; 717/177; 713/191

(58) Field of Classification Search .................. None
See application file for complete search history.

(56) References Cited

U.S. PATENT DOCUMENTS

| | | | | |
|---|---|---|---|---|
| 5,978,842 A * | 11/1999 | Noble et al. | ................... | 709/218 |
| 6,029,196 A * | 2/2000 | Lenz | ............................. | 709/221 |
| 6,128,730 A * | 10/2000 | Levine | ............................. | 713/1 |
| 6,314,458 B1 * | 11/2001 | Steele et al. | ................... | 709/219 |
| 6,502,124 B1 * | 12/2002 | Shimakawa et al. | ........... | 709/203 |
| 6,832,346 B2 * | 12/2004 | Cross | ............................... | 714/49 |
| 6,895,401 B2 * | 5/2005 | Skinner et al. | ......................... | 1/1 |
| 6,990,656 B2 * | 1/2006 | Ersek et al. | .................... | 717/121 |
| 7,392,518 B1 * | 6/2008 | Chhabra et al. | ............... | 717/168 |
| 7,496,641 B2 * | 2/2009 | Ohtsuka | ........................ | 709/218 |
| 7,546,594 B2 * | 6/2009 | McGuire et al. | ............... | 717/168 |
| 7,676,448 B2 * | 3/2010 | Henderson et al. | ........... | 717/171 |
| 8,020,158 B2 * | 9/2011 | Xie et al. | ........................ | 717/171 |
| 8,051,416 B2 * | 11/2011 | Grund et al. | ................... | 717/172 |
| 8,136,090 B2 * | 3/2012 | Boss et al. | ..................... | 717/121 |
| 2002/0129095 A1 * | 9/2002 | Hatalkar | ........................ | 709/203 |

(Continued)

OTHER PUBLICATIONS

Srinath Shankar et al., "Data Driven Workflow Planning in Cluster Management Systems", [Online], 2007, pp. 127-136, [Retrieved from Internet on Apr. 27, 2012], <http://delivery.acm.org/10.1145/1280000/1272383/p127-shankar.pdf>.*

(Continued)

Primary Examiner — Thuy Dao
Assistant Examiner — Ziaul A Chowdhury
(74) Attorney, Agent, or Firm — Staas & Halsey LLP

(57) ABSTRACT

In a software management process, a software management apparatus, and a computer-readable medium storing a software management program for managing software installed in clients: a profile for a client is updated in accordance with a change notice on receipt of the change notice from the client; settings of the software in other clients which belong to the same group as the above client are determined to be synchronized with the settings of the software in the above client by reference to group information when the above profile for the above client is updated; and a synchronization notice indicating that the update of the above profile is to be reflected in the settings of the software in the other clients is sent to the other clients, and each of one or more profiles for the other clients is updated in accordance with the synchronization notice.

17 Claims, 17 Drawing Sheets

U.S. PATENT DOCUMENTS

| | | | |
|---|---|---|---|
| 2003/0061323 A1* | 3/2003 | East et al. | 709/223 |
| 2003/0131134 A1* | 7/2003 | Lewis | 709/246 |
| 2004/0003266 A1* | 1/2004 | Moshir et al. | 713/191 |
| 2004/0117226 A1* | 6/2004 | Laiho et al. | 705/7 |
| 2004/0205148 A1* | 10/2004 | Bae et al. | 709/213 |
| 2005/0132348 A1* | 6/2005 | Meulemans et al. | 717/168 |
| 2005/0132349 A1* | 6/2005 | Roberts et al. | 717/168 |
| 2006/0106939 A1* | 5/2006 | Cha et al. | 709/230 |
| 2006/0282435 A1* | 12/2006 | Moon et al. | 707/10 |
| 2009/0111455 A1* | 4/2009 | Wen et al. | 455/421 |
| 2011/0107300 A1* | 5/2011 | Vidal et al. | 717/121 |

OTHER PUBLICATIONS

Huan Liu, "Rapid Application Configuration in Amazon Cloud using Configurable Virtual Appliances", [Online], 2011, pp. 147-154, [Retrieved from Internet on Apr. 27, 2012], <http://delivery.acm.org/10.1145/1990000/1982221/p147-liu.pdf>.*

Andr_e van der Hoek et al., "A Reusable, Distributed Repository for Configuration Management Policy Programming", [Online], Sep. 1998, pp. 1-30, [Retrieved from Internet on Apr. 27, 2012], <http://www.inf.usi.ch/carzaniga/papers/CU-CS-864-98.pdf>.*

Yair Amir et al., "From Total Order to Database Replication", [Online], Nov. 2001, pp. 1-26, [Retrieved from Internet on Apr. 27, 2012], <http://citeseerx.ist.psu.edu/viewdoc/download?doi=10.1.1.71.6556&rep=rep1&type=pdf>.*

Patent Abstracts of Japan, Publication No. 05-298223, Published Nov. 12, 1993.

Patent Abstracts of Japan, Publication No. 2001-034580, Published Feb. 9, 2001.

* cited by examiner

| Item-list Table ||
|---|---|
| Software Name | Setting Item |
| Mail X | Version, Mail Address, POP Server |
| WordPro Y | Version, Initial Template |
| ⋮ | ⋮ |

FIG. 6

| Setting-information Table (ID: 01-23-45-67-89-AB) ||||
|---|---|---|---|
| Software Name | Setting Item | Setting Value | Remarks |
| Mail X | Version | 1.1 | |
| | Mail Address | foo@example.jp | |
| | POP Server | 123.123.123.XXX | |
| WordPro Y | Version | 9.1 | Version 9.2 Refused |
| | Initial Template | normal.doc | |
| ⋮ | ⋮ | ⋮ | ⋮ |

| Group-information Table ||
|---|---|
| Group Name | Client ID |
| Group A | 01-23-45-67-89-AB,<br>12-34-56-78-9A-BC,<br>23-45-67-89-AB-CD |
| ⋮ | ⋮ |

| License-information Table | | |
|---|---|---|
| Program Name | License Condition | License Key |
| Mail X ver1.1 | Unlimited | Unnecessary |
| WordPro Y ver9.2 | Number of Remaining Licenses 1 | A12345 |
| WordPro Y ver9.3 | Number of Remaining Licenses 3 | B67890 |
| ⋮ | ⋮ | ⋮ |

SOFTWARE MANAGEMENT PROCESS, SOFTWARE MANAGEMENT APPARATUS, AND COMPUTER-READABLE MEDIUM STORING SOFTWARE MANAGEMENT PROGRAM

CROSS-REFERENCE TO RELATED APPLICATIONS

This application is based upon and claims the benefits of priority from the prior Japanese Patent Application No. 2006-239746 filed on Sep. 5, 2006, the entire contents of which are incorporated herein by reference.

BACKGROUND OF THE INVENTION

1. Field of the Invention

The present invention relates to a software management process, a software management apparatus, and a computer-readable medium storing a software management program for managing software installed in a plurality of clients through a network.

2. Description of the Related Art

The recent progress in the downsizing and cost reduction in the computers enables each user of the computers to use more than one computer, and the current computer users can properly use more than one computer according to the occasion. For example, a single user can use a desktop computer indoors, and a portable (laptop) computer or a PDA (personal Digital Assistant) outdoors. Further, more than one operation may be executed in parallel by concurrently using more than one computer.

In some cases, an identical type of software is installed in a plurality of computers so that similar operations are executed in the plurality of computers. For example, software for transmission and reception of electronic mails (e-mails) may be installed in both of a desktop computer and a laptop computer so that e-mails can be transmitted or received at either of the desktop computer and the laptop computer. However, in the case where an identical type of software is installed in a plurality of computers, manual operations are required to be performed on all the computers when the settings of the software is changed, so that a heavy burden is imposed on the user. For example, when an e-mail address is changed, it is necessary to manually change the setting of the e-mail address in all the computers.

In some techniques proposed for solving the above problem (as disclosed in Japanese Unexamined Patent Publications Nos. 5-298223 and 2001-34580), a plurality of computers (hereinafter referred to as clients) to be managed are connected to a server computer (hereinafter referred to as a server) through a network, and the server controls information on the settings of software (software-setting information) in a centralized manner. (Hereinafter, Japanese Unexamined Patent Publications Nos. 5-298223 and 2001-34580 are respectively referred to as JPP 5-298223 and JPP 2001-34580.) According to the above techniques, the server stores the latest software-setting information at all times, and each client acquires the latest software-setting information for use on start-up. Thus, it is possible to easily equalize the settings of the software in the plurality of computers, so that the burden of the operation for changing the settings of the software imposed on the user can be greatly reduced.

Nevertheless, a method for concurrently using the plurality of clients is not considered in the techniques disclosed in JPP 5-298223 and 2001-34580, and the disclosed techniques lack flexibility for the following reasons.

In many cases in which the plurality of clients are concurrently used, different roles are assigned to the respective clients. In such cases, the settings of the software in the clients are intentionally differentiated. Therefore, it is not desirable to automatically set identical information to all the clients. However, the above techniques cannot flexibly determine what software-setting information should be used in each client.

In addition, in some cases in which a plurality of clients are concurrently used, the settings of software in only specific ones of the clients are required to be simultaneously changed. For example, in the case where parallel processing is performed by using two clients, the settings of software in the two clients are required to be simultaneously changed. On the other hand, according to the techniques disclosed in JPP 5-298223 and 2001-34580, the user is required to perform an operation of acquiring the software-setting information stored in the server, so that it is impossible to simultaneously change the settings of the software at a predetermined time.

SUMMARY OF THE INVENTION

The first object of the present invention is to provide a software management process and a software management apparatus which can divide a plurality of clients into groups, and simultaneously change settings of software in each group.

The second object of the present invention is to provide a computer-readable medium storing a software management program which can divide a plurality of clients into groups, and simultaneously change settings of software in each group.

In order to accomplish the first object, according to the first aspect of the present invention, a software management process for managing software installed in a plurality of clients is provided. The software management process comprises the steps of: (a) performing an update of one of a plurality of profiles for one of the plurality of clients in accordance with a change notice on receipt of the change notice from the one of the plurality of clients, where the plurality of profiles are respectively stored for the plurality of clients and respectively contain information on settings of the software in the plurality of clients; (b) referring to group information, which is stored and defines one or more groups each constituted by one or more of the plurality of clients, and determining that settings of the software in one or more other clients which belong to the same group as the one of the plurality of clients are to be synchronized with the settings of the software in the one of the plurality of clients, when the one of the profiles for the one of the plurality of clients is updated; and (c) sending to the one or more other clients a synchronization notice indicating that the update of the one of the profiles is to be reflected in the settings of the software in the one or more other clients, and performing an update of one or more of the profiles for the one or more other clients in accordance with the synchronization notice.

In addition, in order to accomplish the first object, according to the second aspect of the present invention, a software management apparatus for managing software installed in a plurality of clients is also provided. The software management apparatus comprises: a profile storing unit which stores a plurality of profiles for the plurality of clients, where each of the plurality of profiles contains information on settings of the software in one of the plurality of clients corresponding to the each of the plurality of profiles; a group-information storing unit which stores group information defining one or more groups each constituted by one or more of the plurality of clients; a profile updating unit which performs an update of one of the plurality of profiles for one of the plurality of clients in accordance with a change notice when the software management apparatus receives the change notice from the one of the plurality of clients, and the change notice indicates that a change is made in the settings of the software in the one of the plurality of clients; a synchronized-object determination unit which refers to the group-information storing unit, and determines that the settings of the software in one or more other clients belonging to the same group as the one of the plurality of clients are to be synchronized with the settings of the software in the one of the plurality of clients, when the one of the plurality of profiles for the one of the plurality of clients is updated; and a synchronization control unit which sends to the one or more other clients a synchronization notice indicating that the update of the one of the plurality of profiles is to be reflected in the settings of the software in the one or more other clients, and performs an update of one or more of the plurality of profiles for the one or more other clients in accordance with the synchronization notice.

Further, in order to accomplish the second object, a computer-readable medium storing a software management program which makes a computer realize the above software management apparatus according to the second aspect of the present invention is provided.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 6 is a diagram illustrating an example of a data structure of an item-list table.

FIG. 7 is a diagram illustrating an example of a data structure of a setting-information table.

FIG. 8 is a diagram illustrating an example of a data structure of a group-information table.

FIG. 9 is a diagram illustrating an example of a data structure of a license-information table.

DESCRIPTION OF THE PREFERRED EMBODIMENTS

A preferred embodiment of the present invention will be described below with reference to the accompanying drawings. First, an outline of the present invention which is realized in the embodiment is indicated, and thereafter details of the embodiment are explained.

Outline of the Present Invention

Figure 1:
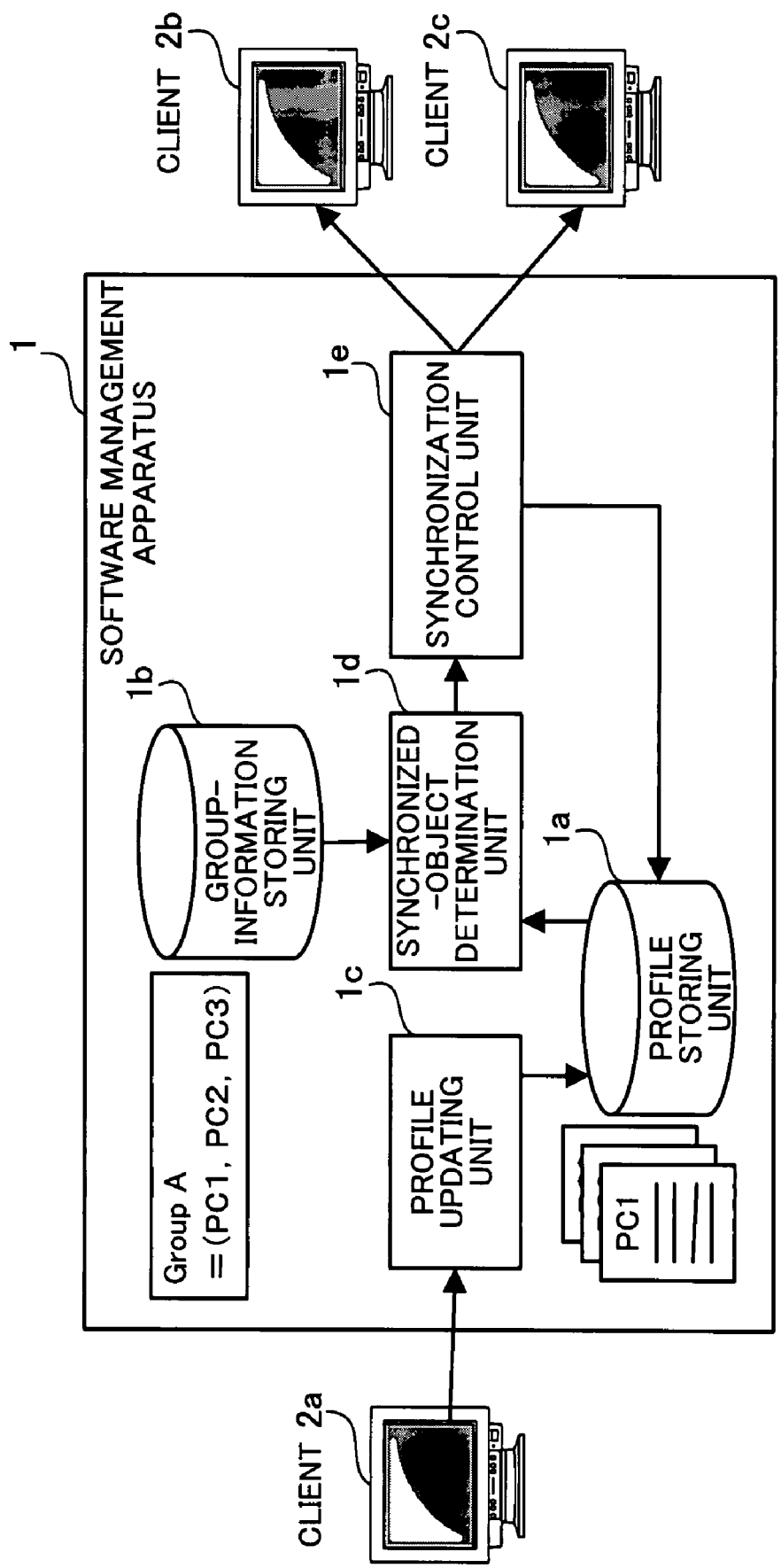
FIG. 1 is a diagram illustrating an outline of the present invention.

FIG. 1 is a diagram illustrating an outline of the present invention. In FIG. 1, when the software management apparatus 1 receives a change notice from the client 2a, the software management apparatus 1 equalizes (synchronizes) the settings of software in a group to which the clients 2a, 2b, and 2c belong, by sending a synchronization notice to the other clients 2b and 2c belonging to the same group as the client 2a. The software management apparatus 1 is connected to the clients 2a, 2b, and 2c through a network. The software management apparatus 1 comprises a profile storing unit 1a, a group-information storing unit 1b, a profile updating unit 1c, a synchronized-object determination unit 1d, and a synchronization control unit 1e.

The profile storing unit 1a stores a profile for each of the clients 2a, 2b, and 2c. In each profile, information on settings of the software installed in each of the clients 2a, 2b, and 2c (hereinafter referred to as software-setting information) is written in the profile corresponding to the client. For example, the software-setting information includes information on operating system (OS) and application software.

The group-information storing unit 1b stores group information, in which one or more groups each constituted by the plurality of clients 2a, 2b, and 2c is defined. For example, the group information indicates that the clients 2a, 2b, and 2c belong to the same group.

When the software management apparatus 1 receives from the client 2a a change notice, which indicates that the settings of the software are changed, the profile updating unit 1c updates the profile which corresponds to the client 2a and is stored in the profile storing unit 1a. For example, the change notice includes first information indicating the setting items which are changed and the software in which the settings are changed, and second information indicating the settings after the change.

The synchronized-object determination unit 1d monitors the profile storing unit 1a. When the synchronized-object determination unit 1d detects an update of the profile for the client 2a, the synchronized-object determination unit 1d refers to the group-information storing unit 1b, and determines that the other clients 2b and 2c belonging to the same group as the client 2a are clients to be synchronized.

The synchronization control unit 1e sends to the clients 2b and 2c (which are determined by the synchronized-object determination unit 1d to be synchronized) a synchronization notice indicating that the settings of the software in the clients 2b and 2c are to be changed so that the change in the settings in the profile for the client 2a is reflected in the settings in the clients 2b and 2c. For example, the synchronization notice includes the first information indicating the setting items and the software the settings of which are changed, and the second information indicating the settings after the change. In addition, the synchronization control unit 1e updates the profiles for the clients 2*b* and 2*c* stored in the profile storing unit 1*a*, in accordance with information contained in the synchronization notice.

In the software management apparatus 1 according to the present invention having the above construction, the profile updating unit 1*c* receives a change notice from the client 2*a*, and updates the profile for the client 2*a*. Then, the synchronized-object determination unit 1*d* detects the updating of the profile, and determines that the other clients 2*b* and 2*c* belonging to the same group as the client 2*a* are to be synchronized. Thereafter, the synchronization control unit 1*e* sends to the clients 2*b* and 2*c* (which are determined by the synchronized-object determination unit 1*d* to be synchronized) a synchronization notice indicating that the updated settings are to be reflected in the settings in the clients 2*b* and 2*c*, and updates the profiles for the clients 2*b* and 2*c*.

Thus, when the settings in the client 2*a* are changed, the settings in the clients 2*b* and 2*c* can also be simultaneously synchronized with the settings in the client 2*a*. Therefore, it is possible to flexibly and easily set and manage the software even in an environment in which the plurality of clients 2*a*, 2*b*, and 2*c* are concurrently used.

Further, the software management apparatus 1 according to the present invention may have the following additional features.

(1) The synchronization control unit 1*e* may update the profiles for the clients 2*b* and 2*c* after the software management apparatus 1 receives from the clients 2*b* and 2*c* acknowledgment responses to the synchronization notice. In this case, it is possible to easily confirm the progress of the operations for changing the settings in the clients 2*a*, 2*b*, and 2*c*.

(2) When the synchronization control unit 1*e* fails in the communication with the clients 2*b* and 2*c*, the synchronization control unit 1*e* may start continuous monitoring of the clients 2*b* and 2*c*. Thereafter, the synchronization control unit 1*e* may resend the synchronization notice when the synchronization control unit 1*e* detects that the communication with the clients 2*b* and 2*c* is recovered. In this case, the synchronization control unit 1*e* can automatically restart the operation for synchronization when the communication with the clients 2*b* and 2*c* is recovered from a failure, which can be caused by the clients 2*b* and 2*c* before the clients 2*b* and 2*c* start up, or by a temporal failure occurring in a communication path between the software management apparatus 1 and the clients 2*b* and 2*c*, so that it is possible to prevent omission of a client during the operation for changing the settings of the software.

(3) When the software management apparatus 1 receives from at least one of the clients 2*b* and 2*c* an acknowledgment response (to the synchronization notice) indicating refusal of at least a part of the change in the settings indicated in the synchronization notice, the synchronization control unit 1*e* may omit the update of all or a part of the settings the change of which is refused by the response, and display a report of the failure in the synchronization on a predetermined display device. In this case, the user can quickly recognize the client which refuses the change and one or more setting items the change of which is refused, so that it is possible to prevent the user from having a misunderstanding that all the settings in all the clients indicated by the synchronization notice have been changed.

(4) When the software management apparatus 1 receives from at least one of the clients 2*b* and 2*c* an acknowledgment response (to the synchronization notice) containing a refusal of at least a part of the change in the settings indicated in the synchronization notice, the synchronization control unit 1*e* may omit the update of all or a part of the settings of the software in the at least one of the clients 2*b* and 2*c* the change of which is refused by the response, and add to the corresponding profiles a refusal record, which indicates the occurrence of the refusal of the change. In addition, when a refusal record is added to a profile for one of the clients determined by the synchronized-object determination unit 1*d* to be synchronized, the synchronized-object determination unit 1*d* may omit the change in the settings of the software in the at least one of the clients 2*b* and 2*c* which is refused by the response. In this case, it is possible to prevent transmission of a synchronization notice indicating a change in settings which has been refused, to a client which has previously refused the change, and therefore dispense with unnecessary processing and communication.

(5) The software management apparatus 1 according to the present invention may further comprise an item-list storing unit and a profile registration unit. The item-list storing unit stores an item list for each type of software, and the item list indicates setting items which are to be included in the profiles. When the software management apparatus 1 receives from the clients 2*a*, 2*b*, and 2*c* a registration request indicating a type of software installed in the clients, the profile registration unit recognizes setting items corresponding to the type of software by reference to the item-list storing unit, and sends a list of the setting items to the clients 2*a*, 2*b*, and 2*c*. Thereafter, when the software management apparatus 1 receives from the clients 2*a*, 2*b*, and 2*c* software-setting information corresponding to the above list, the profile registration unit produces profiles by using the received software-setting information, and stores the produced profiles in the profile storing unit 1*a*. In this case, it is possible to designate in advance the setting items to be synchronized, for each type of software, and collect software-setting information corresponding to only the above setting items (which are to be synchronized) when the profiles are registered.

(6) The software management apparatus 1 according to the present invention may further comprise a file storing unit, which stores files necessary for execution of the software, and when addition of a file is needed for the change indicated by the synchronization notice, the synchronization control unit 1*e* may acquire from the file storing unit the file to be added, and send the acquired file together with the synchronization notice. In this case, it is possible to automatize installation of new software or updating of installed software.

(7) The file storing unit may further store information on a license for the software (license information), and the synchronization control unit 1*e* may refer to the license information when the synchronization control unit 1*e* acquires the file from the file storing unit, and send the acquired file together with the synchronization notice only when the license permits the addition of the file at the destination of the synchronization notice. In this case, it is possible to manage the license for the software in a centralized manner, and prevent loss of the license information. Further, it is also possible to automatically prevent installation and updating of software which are not permitted by the license.

Hereinbelow, details of the preferred embodiment are explained with reference to FIGS. 2 to 17.

System Configuration

Figure 2:
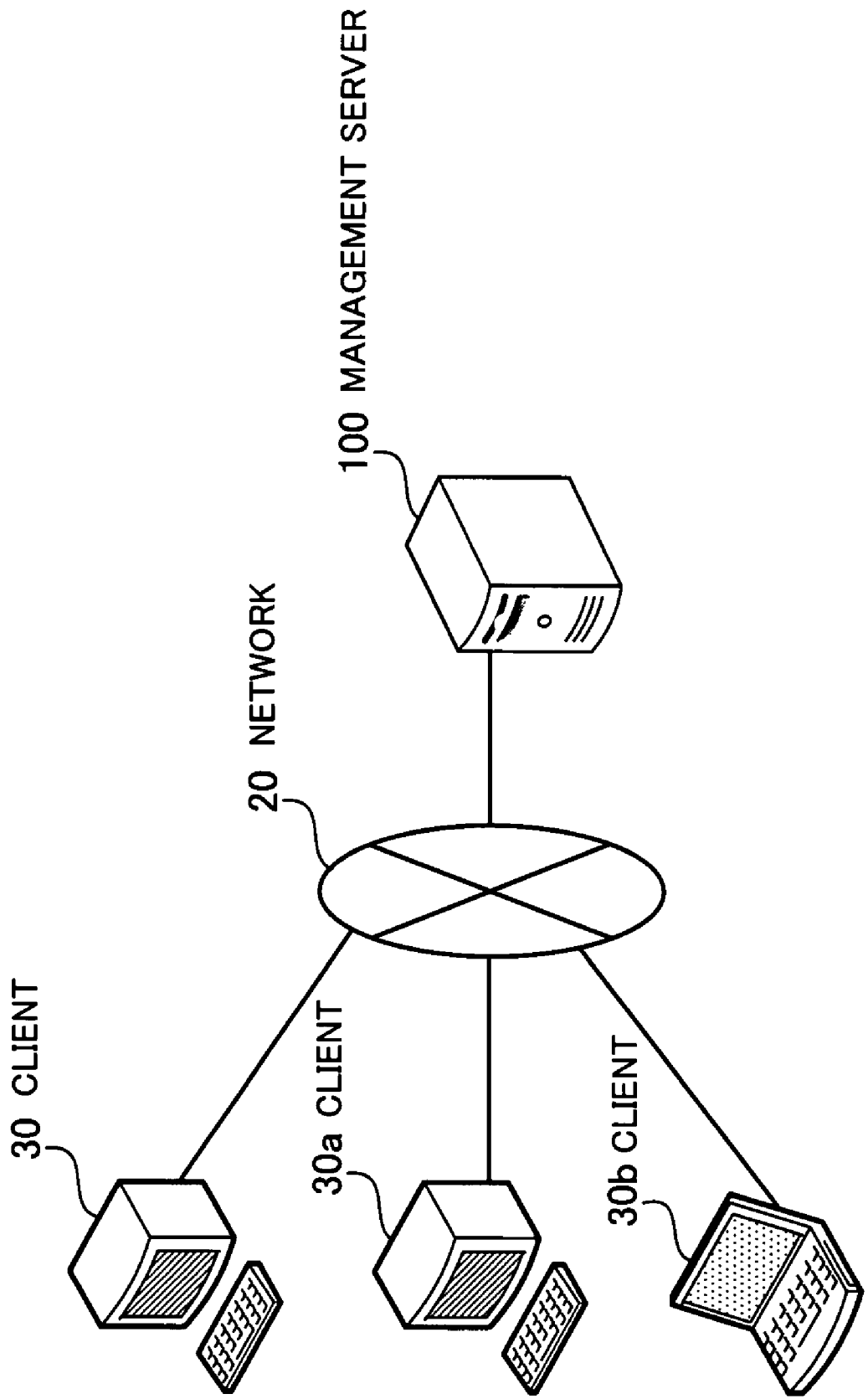
FIG. 2 is a diagram illustrating an example of a system configuration according to an embodiment of the present invention.

FIG. 2 is a diagram illustrating an example of a configuration of a software management system according to the preferred embodiment of the present invention. In the software management system according to the present embodiment, application software installed in a plurality of clients which are used by a single user is managed by a management server through a network in a centralized manner. The example of the software management system illustrated in FIG. 2 is constituted by the management server 100, the network 20, and the clients 30, 30a, and 30b. The clients 30, 30a, and 30b are connected to the management server 100 through the network 20. In each of the clients 30, 30a, and 30b, application software such as e-mail transmission/reception software or word processing software is installed. The clients 30, 30a, and 30b are used by the single user, and constitute a group. The management server 100 collects software-setting information for the application software installed in the clients 30, 30a, and 30b, and holds the software-setting information as profiles.

For example, when settings in the application software in the client 30 are changed, the client 30 sends a change notice to the management server 100. The change notice includes first information indicating setting items which are changed and the software in which the settings are changed, and second information indicating the settings after the change. When the management server 100 receives the change notice from the client 30, the management server 100 updates a profile corresponding to the client 30. Thereafter, the management server 100 sends to the clients 30a and 30b (which belong to the same group as the client 30) a synchronization notice indicating that the settings in the clients 30a and 30b are to be changed in a similar manner to the change in the settings in the client 30. In addition, the management server 100 updates the profiles for the clients 30a and 30b when the management server 100 receives from the clients 30a and 30b acknowledgment responses to the synchronization notice.

Hardware Construction

Figure 3:
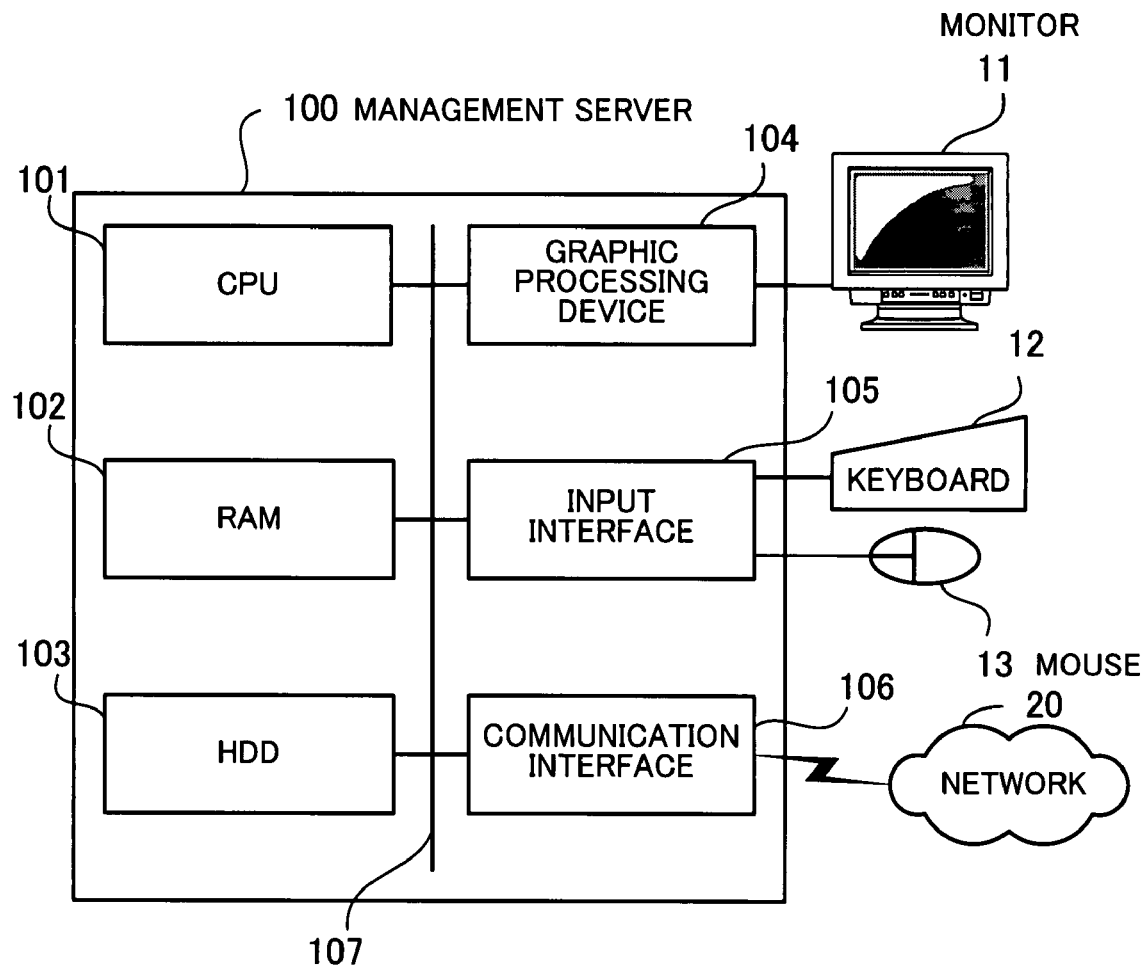
FIG. 3 is a diagram illustrating a hardware construction of a management server used in the embodiment.

Hereinbelow, the hardware constructions of the management server 100 and the clients 30, 30a, and 30b are explained. Since each of the clients 30, 30a, and 30b has a similar hardware construction to the management server 100, only the hardware construction of the management server 100 is explained below. FIG. 3 is a diagram illustrating a hardware construction of the management server used in the embodiment. The entire management server 100 is controlled by a CPU (central processing unit) 101, to which a RAM (random access memory) 102, an HDD (hard disk drive) 103, a graphic processing device 104, an input interface 105, and a communication interface 106 are connected through a bus 107. The RAM 102 temporarily stores at least portions of an OS (operating system) program and application programs which are executed by the CPU 101, as well as various types of data necessary for processing by the CPU 101. The HDD 103 stores the OS program and the application programs. A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 107. The communication interface 106 is connected to the network 20, and exchanges data with other computers through the network 20.

By using the above hardware construction, it is possible to realize the functions of the management server 100 according to the present embodiment.

Functions of Management Server and Clients

Hereinbelow, the functions of the management server 100 and the clients 30, 30a, and 30b are explained.

Figure 4:
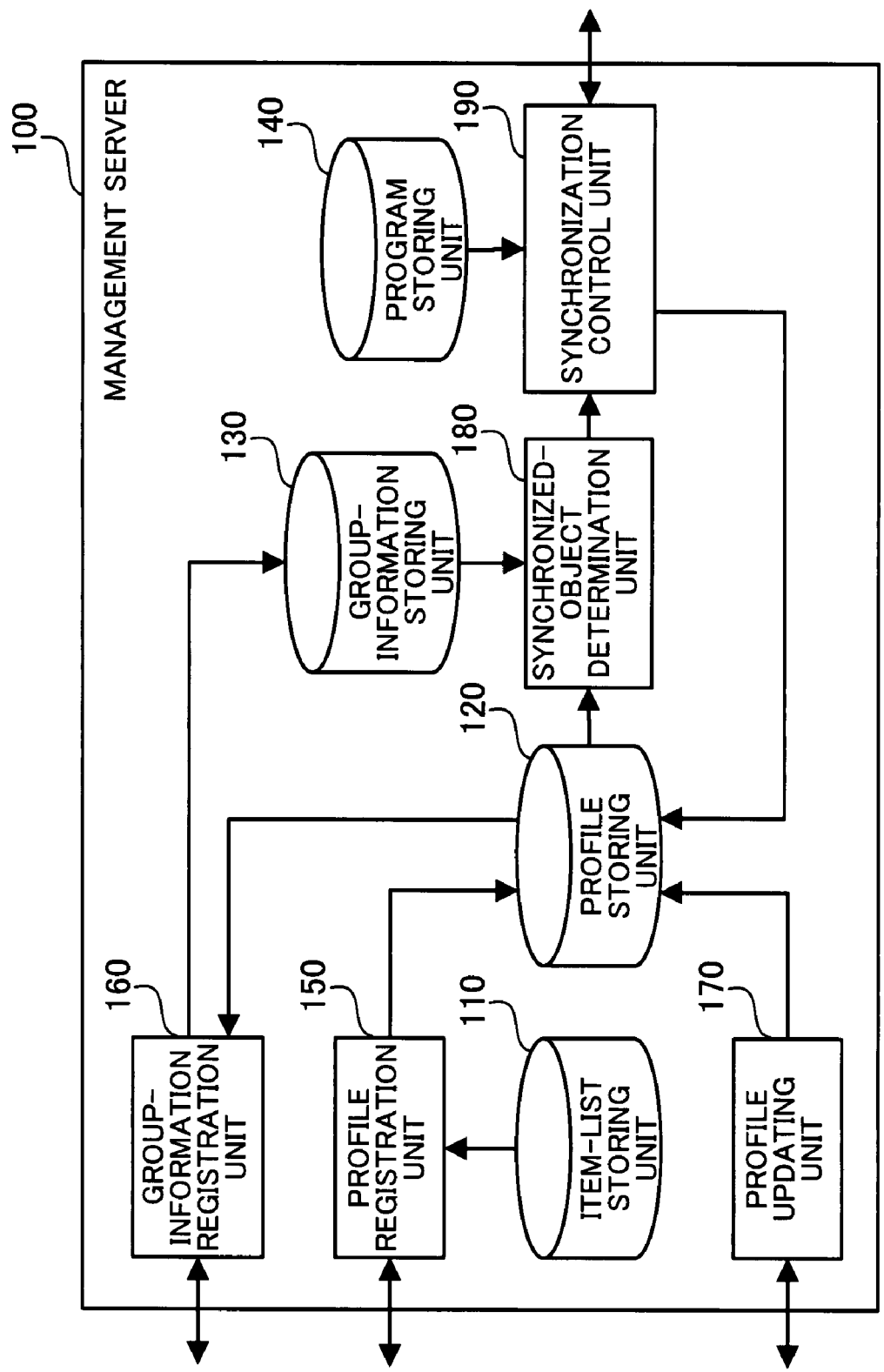
FIG. 4 is a block diagram illustrating the functions of the management server.

First, the functions of the management server 100 are explained with reference to FIG. 4, which is a block diagram illustrating the functions of the management server 100. The management server 100 comprises an item-list storing unit 110, a profile storing unit 120, a group-information storing unit 130, a program storing unit 140, a profile registration unit 150, a group-information registration unit 160, a profile updating unit 170, a synchronized-object determination unit 180, and a synchronization control unit 190. The profile registration unit 150, the group-information registration unit 160, the profile updating unit 170, and the synchronization control unit 190 can communicate with the clients 30, 30a, and 30b through the network 20.

The item-list storing unit 110 stores item lists indicating setting items which are to be written in profiles, which are stored in the profile storing unit 120. An item list is defined for each type of software, and a profile is stored in the profile storing unit 120 for each of the clients 30, 30a, and 30b, so that each profile includes software-setting information for each type of software installed in one of the clients 30, 30a, and 30b corresponding to the profile.

The group-information storing unit 130 stores group information, which defines groups of clients. For example, the group information defines the three clients 30, 30a, and 30b, which constitute a group. The program storing unit 140 stores files of programs which are necessary for execution of the applications (software). The program storing unit 140 also stores license information for each application (software). The license information includes information on the number of clients in which each application (software) can be installed, information on a license key, and the like.

The profile registration unit 150 receives from the clients 30, 30a, and 30b a request to register a client (client-registration request). Each client-registration request contains list information indicating a list of one or more applications (software) installed in a client as the source of the client-registration request. The profile registration unit 150 acquires from the item-list storing unit 110 the item list indicated by the list information being contained in each client-registration request and corresponding to the applications installed in the client as the source of the client-registration request, and returns the acquired item list to the source. Thereafter, when the profile registration unit 150 receives software-setting information corresponding to the item list, the profile registration unit 150 writes the received software-setting information in the profile for the client, and stores the profile in the profile storing unit 120.

The group-information registration unit 160 receives a group-registration request from the clients 30, 30a, and 30b, produces or updates the group information in accordance with information contained in the group-registration request, and stores the group information in the group-information storing unit 130. In addition, when necessary, the group-information registration unit 160 outputs an instruction to synchronize the settings in a client added to a group with the settings in one or more other clients in the group.

The profile updating unit 170 receives from the clients 30, 30a, and 30b a change notice indicating that the settings of software are changed. In addition, the profile updating unit 170 updates the profile (stored in the profile storing unit 120) for the client as the source of the change notice in accordance with information contained in the change notice.

The synchronized-object determination unit 180 monitors the profile storing unit 120 at predetermined time intervals. When the synchronized-object determination unit 180 detects that a profile is updated, the synchronized-object determination unit 180 refers to the group-information storing unit 130, and determines that (the settings of the software in) the other clients belonging to the same group as the client for which the profile is updated are to be synchronized with (the settings of the software in) the client for which the profile is updated. When the time intervals at which the synchronized-object determination unit 180 monitors the profile storing unit 120 are reduced, it is possible to determine the clients to be synchronized, on a nearly real-time basis.

The synchronization control unit 190 sends a synchronization notice to each client which is determined to be synchronized by the synchronized-object determination unit 180. The synchronization notice contains an instruction to change the settings in the client so as to reflect in the settings the update detected by the synchronized-object determination unit 180. When addition of a program file is needed for the change in the settings, the synchronization control unit 190 acquires the necessary file from the program storing unit 140, and sends to the client the acquired file together with the synchronization notice. In addition, when the synchronization control unit 190 receives an acknowledgment response from the client to which the synchronization notice is sent, the synchronization control unit 190 updates the corresponding profile in accordance with the information contained in the acknowledgment response. When necessary, the synchronization control unit 190 sends a result of the synchronization processing to the client which is the source of the change notice.

Figure 5:
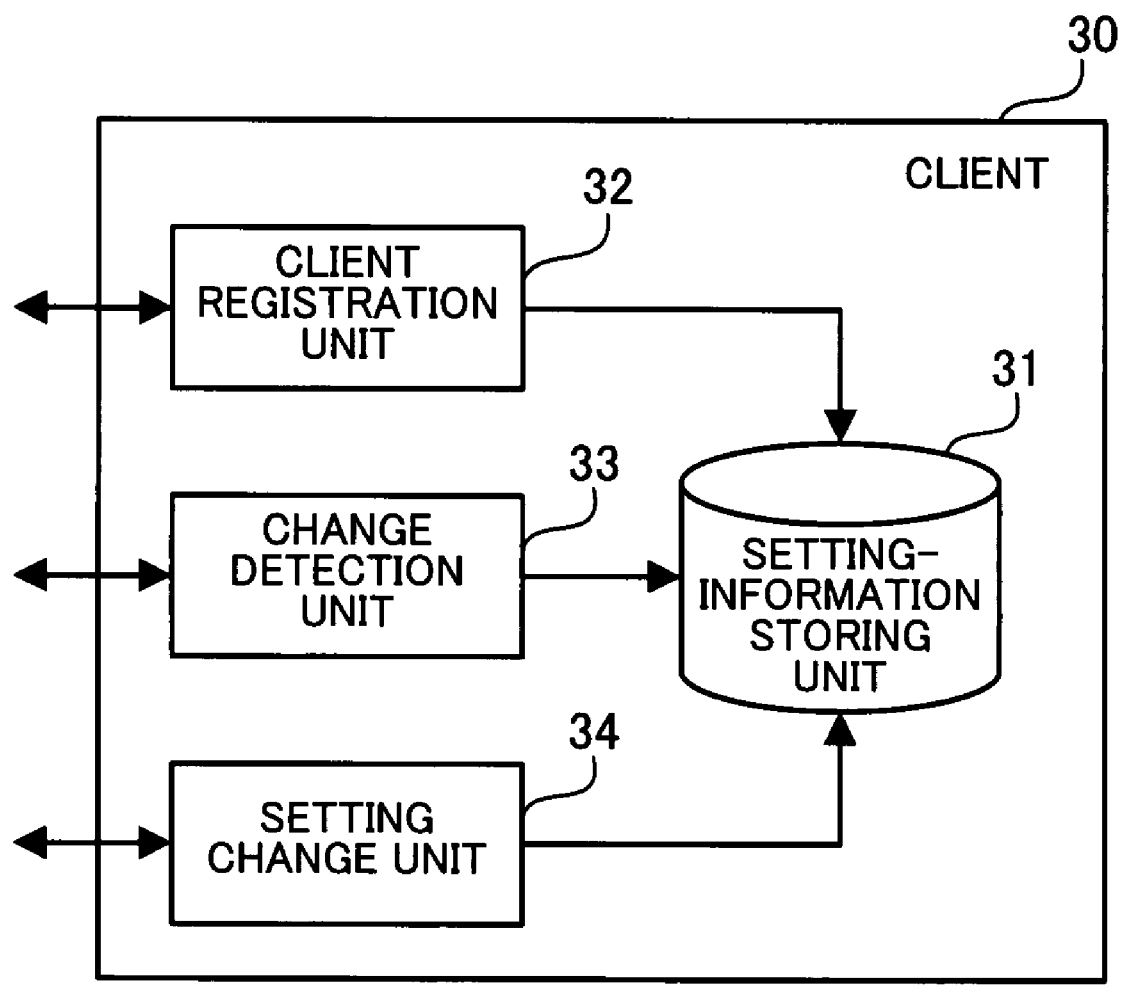
FIG. 5 is a block diagram illustrating the functions of a client.

Next, the functions of the client 30 are explained with reference to FIG. 5, which is a block diagram illustrating the functions of the client 30. Since the clients 30*a* and 30*b* have similar functions to the client 30, only the functions of the client 30 are explained. The client 30 comprises a setting-information storing unit 31, a client registration unit 32, a change detection unit 33, and a setting change unit 34. The client registration unit 32, the change detection unit 33, and the setting change unit 34 can communicate with the management server 100 through the network 20.

The setting-information storing unit 31 stores software-setting information for each application installed in the client 30. The software-setting information stored in the setting-information storing unit 31 is similar to the software-setting information included in the profile for the client 30 held by the management server 100.

When the client registration unit 32 receives a manual input by the user, the client registration unit 32 sends the client-registration request and the group-registration request to the management server 100. In addition, when the client registration unit 32 receives from the management server 100 an item list corresponding to the client-registration request, the client registration unit 32 collects software-setting information corresponding to the item list, and returns the software-setting information to the management server 100.

The change detection unit 33 collects the software-setting information for one or more applications installed in the client 30, at predetermined time intervals. When the change detection unit 33 detects a change in the settings on the basis of the difference from the previously collected software-setting information, the change detection unit 33 sends a change notice to the management server 100.

When the setting change unit 34 receives a synchronization notice from the management server 100, the setting change unit 34 changes the settings in the one or more applications (software) installed in the client 30, on the basis of information contained in the received change notice. When the setting change unit 34 receives a program file together with the change notice, the setting change unit 34 also performs processing for adding a program. Further, the setting change unit 34 returns a result of the change in the settings in the client 30 to the management server 100.

Data Structures

Hereinbelow, the data structures of data held by the management server 100 are indicated below.

First, an example of a data structure of an item-list table is explained below. FIG. 6 is a diagram illustrating an example of a data structure of the item-list table. The item-list table 110*a* is stored in the item-list storing unit 110. In the item-list table 110*a*, setting items for each type of application are listed in a tabular form having the "Software Name" field 111 and the "Setting Item" field 112, and the entries in each row are associated with each other. The name of each application (software name) is indicated in the "Software Name" field 111, and a list of setting items to be collected for the application the name of which is indicated in the same row is indicated in the "Setting Item" field 112. In the list, the setting items are separated by commas. The information indicated in the item-list table 110*a* is registered in advance by the user of the clients 30, 30*a*, and 30*b* or an administrator of the management server 100. For example, as illustrated in FIG. 6, the setting items "Version," "Mail Address," and "POP Server" are indicated in association with the software name "Mail X."

Next, a data structure of setting-information tables, which respectively correspond to the aforementioned profiles provided for the clients 30, 30*a*, and 30*b*, is explained below. The setting-information tables are stored in the profile storing unit 120. Since the clients 30, 30*a*, and 30*b* have an identical data format, only the data format of the setting-information table for the client 30 is explained. FIG. 7 is a diagram illustrating an example of a data structure of the setting-information table 120*a* for the client 30. In the setting-information table 120*a*, an identifier (ID) "01-23-45-67-89-AB" of the client 30 is indicated, and software-setting information for each application is indicated in a tabular form. The setting-information table 120*a* has the "Software Name" field 121 indicating the name of each application, the "Setting Item" field 122 indicating one or more setting items in the corresponding application (the name of which is indicated in the "Software Name" field 121), the "Set Value" field 123 indicating one or more set values of the one or more setting items, and the "Remarks" field 124 indicating remarks on the corresponding application. Specifically, one or more changes of the settings which have been previously refused by the client 30 may be recorded in the "Remarks" field 124.

The software-setting information contained in the setting-information table 120*a* is registered by the profile registration unit 150 in response to a client-registration request sent from the client 30. In addition, the software-setting information contained in the setting-information table 120*a* is updated by the profile updating unit 170 in response to a change notice sent from the client 30. In addition, the software-setting information contained in the setting-information table 120*a* is updated by the synchronization control unit 190 in response to an acknowledgement response from the client 30. For example, the set value "foo@example.jp" of the setting item "Mail Address" is set for the application "Mail X."

Next, a data structure of a group-information table is explained below. FIG. 8 is a diagram illustrating an example of a data structure of the group-information table. The group-information table 130*a* is stored in the group-information storing unit 130. In the group-information table 130*a*, group information is indicated in a tabular form having the "Group Name" field 131 and the "Client ID" field 132, and the entries in each row are associated with each other. The name of each group (for identifying the group) is indicated in the "Group Name" field 131, and a list of identifiers of clients belonging to the group the name of which is indicated in the same row is indicated in each row of the "Client ID" field 132. In the list, the setting items are separated by commas. The information indicated in the group-information table 130*a* is registered by the group-information registration unit 160 in response to group-registration requests sent from the clients 30, 30*a*, and 30*b*. For example, as illustrated in FIG. 8, the identifiers "01-23-45-67-89-AB," and "12-34-56-78-9A-BC, 23-45-67-89-AB-CD" of the clients 30, 30a, and 30b are registered in association with the group name "Group A."

Next, a data structure of a license-information table is explained below. FIG. 9 is a diagram illustrating an example of a data structure of the license-information table. The license-information table 140a is stored in the program storing unit 140. In the license-information table 140a, license information is indicated in a tabular form having the "Program Name" field 141, the "License Condition" field 142, and the "License Key" field 143, and the entries in each row are associated with each other. The name of each program file stored in the program storing unit 140 is indicated in the "Program Name" field 141. For example, the name of each program file is constituted by the name of the type of application and version information. The license condition for the program indicated in the "Program Name" field 141 is indicated in the "License Condition" field 142. For example, the license condition is the number of remaining clients in which the program can be installed. The license key which is necessary for installation of the program indicated in the "Program Name" field 141 is indicated in the "License Key" field 143. When the license key is unnecessary for installation of a program, "Unnecessary" is indicated in the "License Key" field 143. The license information indicated in the license-information table 140a is registered in advance by the user of the clients 30, 30a, and 30b or the administrator of the management server 100. The number of remaining clients in which the program can be installed is updated by the synchronization control unit 190 when necessary. For example, as illustrated in FIG. 9, the license condition "Number of Remaining Licenses 1" and the license key "A12345" are registered in association with the program name "WordPro Y ver9.2."

Processing

Hereinbelow, details of processing performed in the software management system having the construction illustrated in FIGS. 2 to 5 and the data structures illustrated in FIGS. 6 to 9 are explained.

Figure 10:
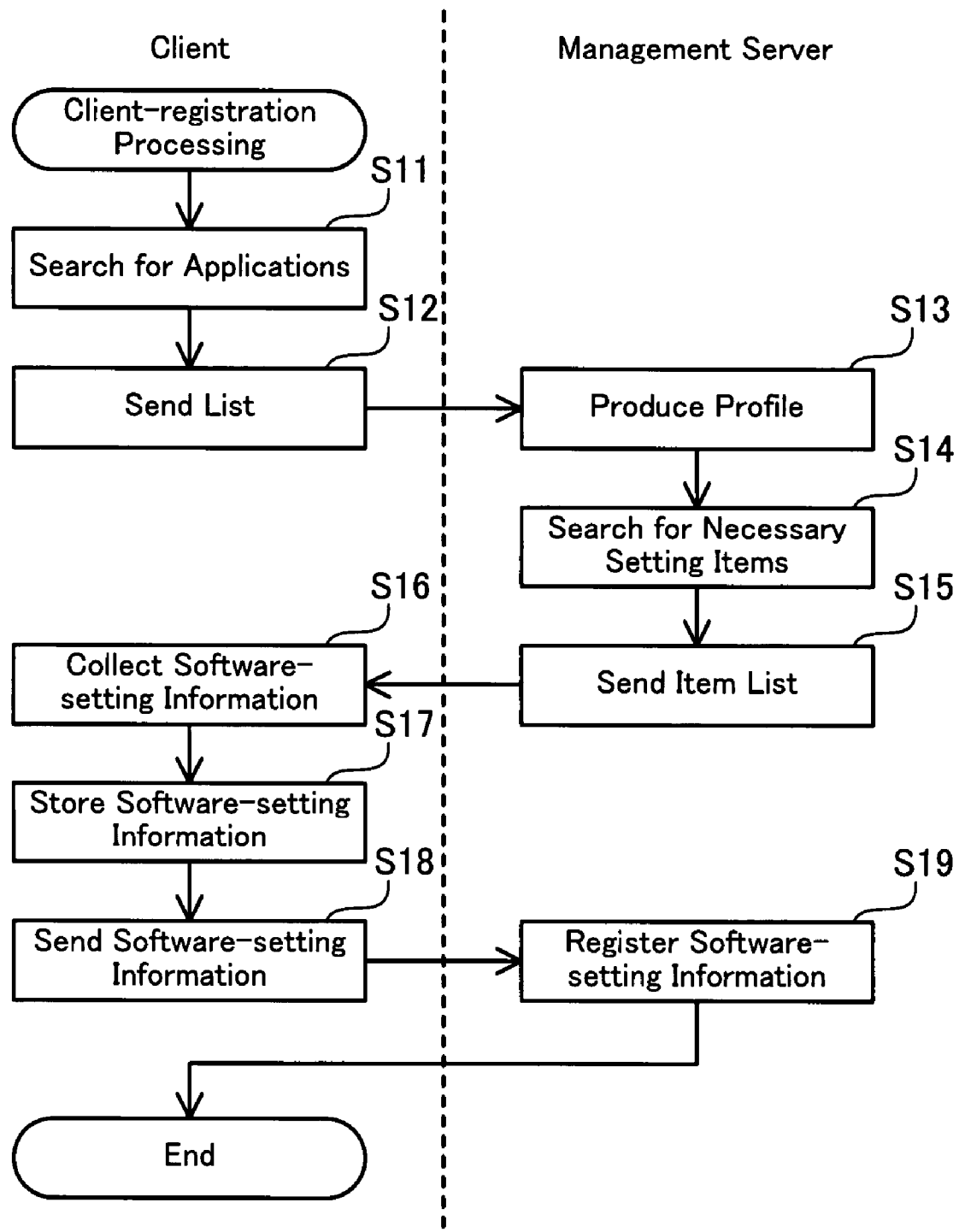
FIG. 10 is a flow diagram indicating a sequence of client-registration processing.

FIG. 10 is a flow diagram indicating a sequence of client-registration processing. In the sequence indicated in FIG. 10, the client 30 sends a client-registration request to the management server 100, and the management server 100 registers a profile for the client 30. Only the processing which is performed when the client 30 sends a client-registration request is explained below since similar processing is performed when the client 30a or 30b sends a client-registration request. The processing indicated in FIG. 10 is explained below step by step.

<Step S11> When an instruction to register a client is manually inputted into the client 30 by the user, the client registration unit 32 in the client 30 searches for one or more applications installed in the client 30. For example, the client registration unit 32 searches information in one or more registries in the operating system (OS), or program files located in one or more predetermined directories.

<Step S12> The client registration unit 32 sends a client-registration request to the management server 100. The client-registration request contains a list of applications found in step S11 and an identifier of the client 30. For example, the identifier may be defined by using a MAC (Media Access Control) address, a client name, or an IP (Internet Protocol) address.

<Step S13> The profile registration unit 150 in the management server 100 produces the setting-information table 120a by using the identifier contained in the client-registration request, and stores the setting-information table 120a in the profile storing unit 120.

<Step S14> The profile registration unit 150 searches the item-list table 110a stored in the item-list storing unit 110, and acquires an item list corresponding to one or more applications indicated in the client-registration request.

<Step S15> The profile registration unit 150 returns the item list acquired in step S14 to the client 30 (as the source of the client-registration request).

<Step S16> The client registration unit 32 collects information corresponding to setting items indicated in the item list. For example, the client registration unit 32 collects software-setting information from one or more registries in the OS or one or more settings files (e.g., INI files) for one or more programs.

<Step S17> The client registration unit 32 stores in the setting-information storing unit 31 the software-setting information collected in step S16.

<Step S18> The client registration unit 32 sends to the management server 100 the software-setting information collected in step S16.

<Step S19> The profile registration unit 150 registers the received software-setting information in the setting-information table 120a produced in step S13.

Figure 11:
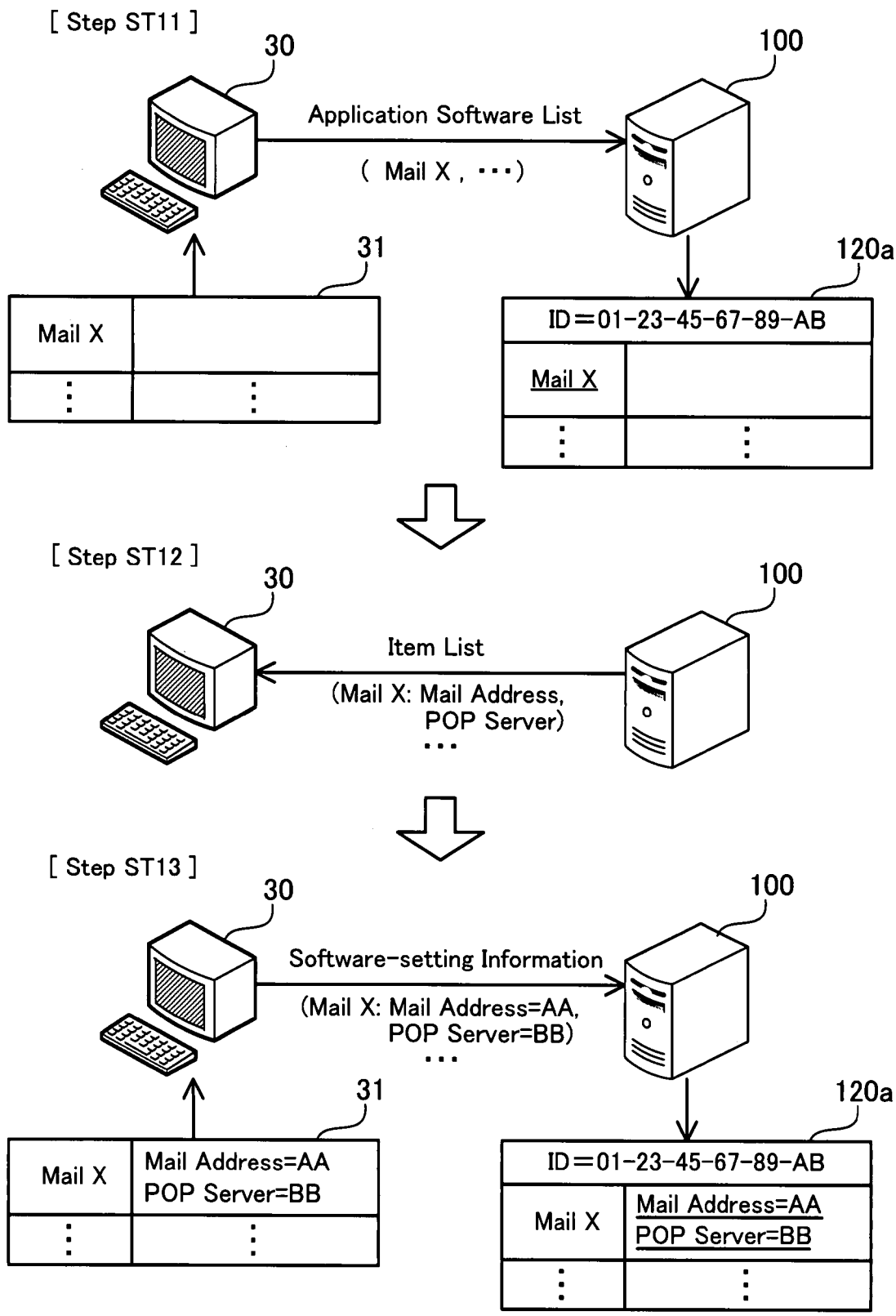
FIG. 11 is a schematic diagram indicating an example of the client-registration processing.

FIG. 11 is a schematic diagram indicating an example of the client-registration processing. In FIG. 11, the client 30 sends a client-registration request to the management server 100.

In step ST11, the management server 100 receives the client-registration request. Then, the management server 100 produces the setting-information table 120a for the client 30.

In step ST12, the management server 100 returns an item list corresponding to the one or more applications installed in the client 30.

In step ST13, the client 30 collects software-setting information corresponding to the received item list, and sends the collected software-setting information to the management server 100. Then, the management server 100 receives the software-setting information, and registers the received software-setting information as a profile.

Figure 12:
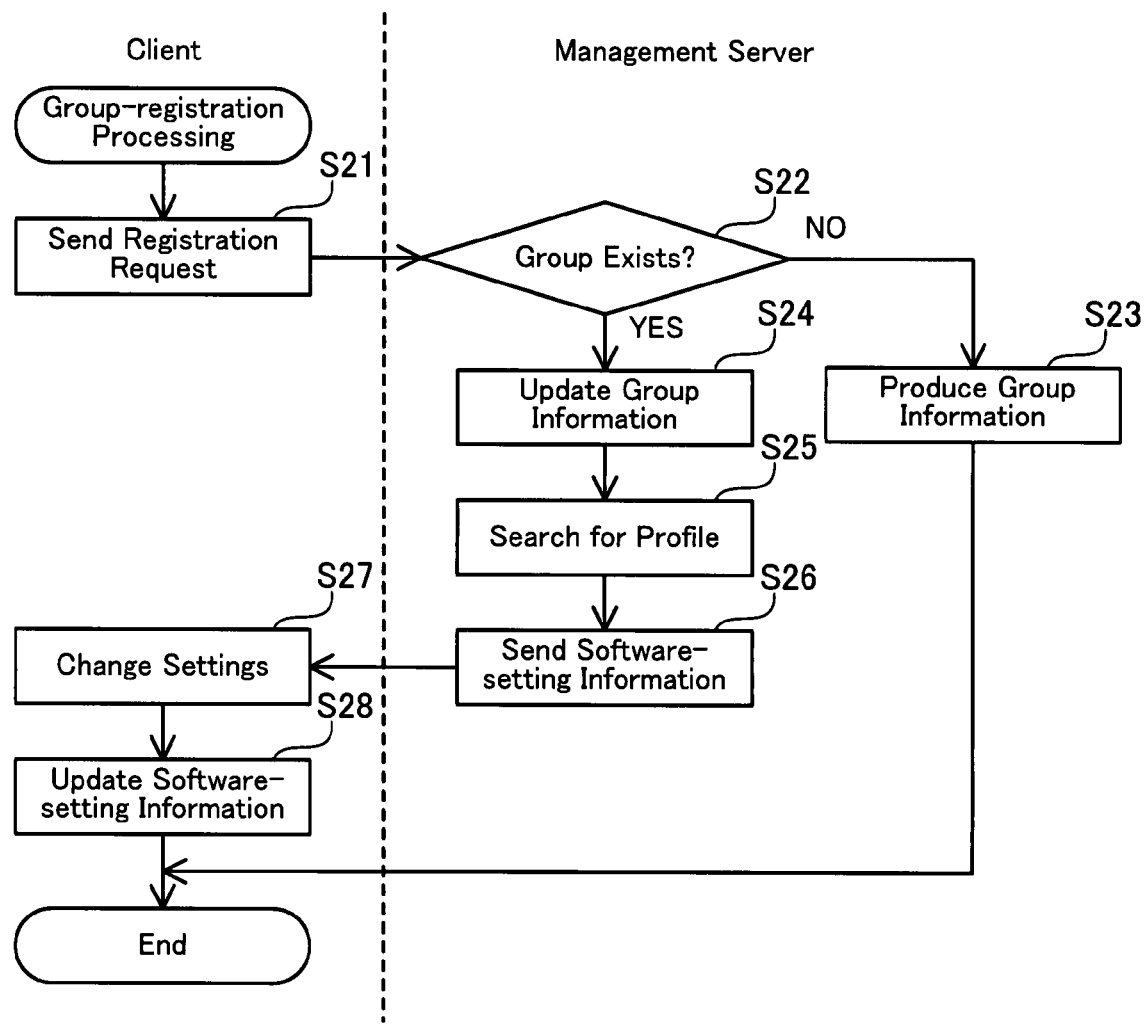
FIG. 12 is a flow diagram indicating a sequence of group-registration processing.

FIG. 12 is a flow diagram indicating a sequence of group-registration processing. In the sequence of FIG. 12, the client 30 sends a group-registration request to the management server 100, and the management server 100 registers the client 30 as member of a group. Only the processing which is performed when the client 30 sends a group-registration request is explained below since similar processing is performed when the client 30a or 30b sends a group-registration request. The processing indicated in FIG. 12 is explained below step by step.

<Step S21> When an instruction to register a group is manually inputted into the client 30 by the user, the client registration unit 32 in the client 30 sends a group-registration request to the management server 100. The group-registration request contains the identifier of the client 30 and the name of a group in which the user requests the client 30 to be registered. The name of the group is designated by the user.

<Step S22> The group-information registration unit 160 in the management server 100 searches the group-information table 130a stored in the group-information storing unit 130, and determines whether or not group information indicating the group designated in the group-registration request exists. When yes is determined, the operation goes to step S24. When no is determined, the operation goes to step S23.

<Step S23> The group-information registration unit 160 produces group information on the basis of the name of the group and the identifier of the client 30 contained in the group-registration request, and registers the group information in the group-information table 130*a*. Then, the processing of FIG. 12 is completed.

<Step S24> The group-information registration unit 160 adds the identifier of the client 30 contained in the group-registration request to the group information (in the "Client ID" field 132) determined in step S22.

<Step S25> The group-information registration unit 160 searches the profile storing unit 120, and acquires one or more setting-information tables corresponding to one or more clients which are already registered in the group information acquired in step S22.

<Step S26> The group-information registration unit 160 sends to the client 30 the software-setting information in the one or more setting-information tables acquired in step S25.

<Step S27> The client registration unit 32 changes the settings in one or more applications on the basis of the received software-setting information.

<Step S28> The client registration unit 32 stores the received software-setting information in the setting-information storing unit 31.

As described above, the client 30 sends a group-registration request to the management server 100. When the group designated in the group-registration request is not yet registered in the management server 100, the management server 100 defines and registers a new group. When the group designated in the group-registration request is already registered in the management server 100, the management server 100 adds the client 30 to the group designated in the group-registration request, and sends to the client 30 the software-setting information on the other clients in the group which are already registered. Thus, it is possible to immediately synchronize the settings in a newly arranged client with the settings in the already existing clients.

Figure 13:
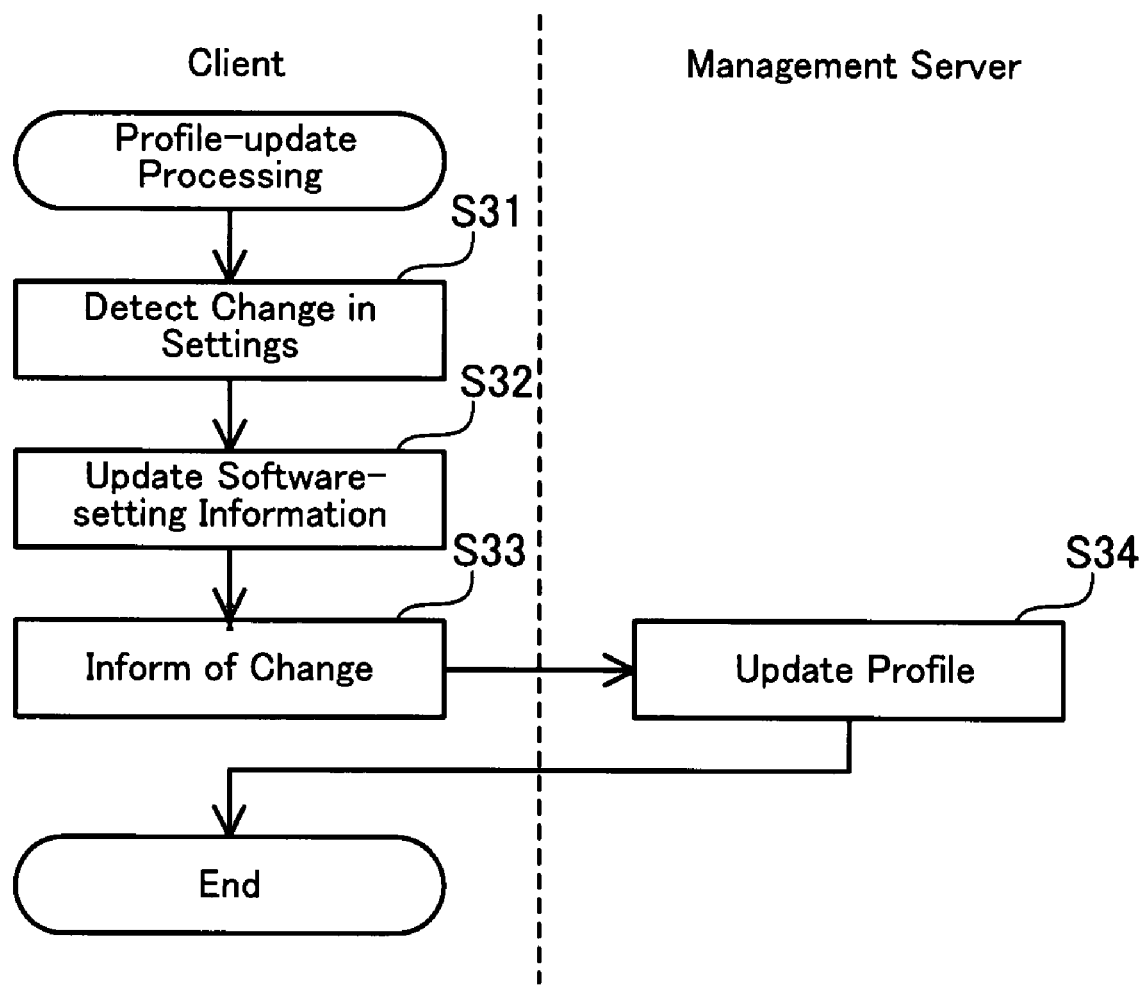
FIG. 13 is a flow diagram indicating a sequence of profile-update processing.

FIG. 13 is a flow diagram indicating a sequence of profile-update processing. In the sequence of FIG. 13, the client 30 sends a change notice to the management server 100, and the management server 100 updates the profile for the client 30. Only the processing which is performed when the client 30 sends a change notice is explained below since similar processing is performed when the client 30*a* or 30*b* sends a change notice. The processing indicated in FIG. 13 is explained below step by step.

<Step S31> The change detection unit 33 in the client 30 collects software-setting information for one or more applications installed in the client 30, and determines whether or not the software-setting information is changed, at predetermined time intervals. In addition, when the user manually inputs an instruction to determine whether or not the software-setting information is changed, the change detection unit 33 also makes such a determination. For example, the change detection unit 33 examines one or more registries in the OS (operating system) or one or more settings files for one or more programs which are located in one or more predetermined directories. Thus, the change detection unit 33 detects a change in the software-setting information.

<Step S32> The change detection unit 33 reflects the change in the software-setting information detected in step S31, in the software-setting information stored in the setting-information storing unit 31.

<Step S33> The change detection unit 33 sends a change notice to the management server 100. The change notice contains the software-setting information detected in step S31 and the identifier of the client 30.

<Step S34> The profile updating unit 170 in the management server 100 acquires the setting-information table 120*a* for the client 30 which is stored in the profile storing unit 120, and updates the software-setting information registered in the setting-information table 120*a*, in accordance with the information contained in the change notice.

As described above, when the client 30 detects that the settings of the applications are changed, the client 30 sends a change notice to the management server 100. When the management server 100 receives the change notice, the management server 100 acquires the setting-information table corresponding to the source of the change notice, and updates the software-setting information.

Figure 14:
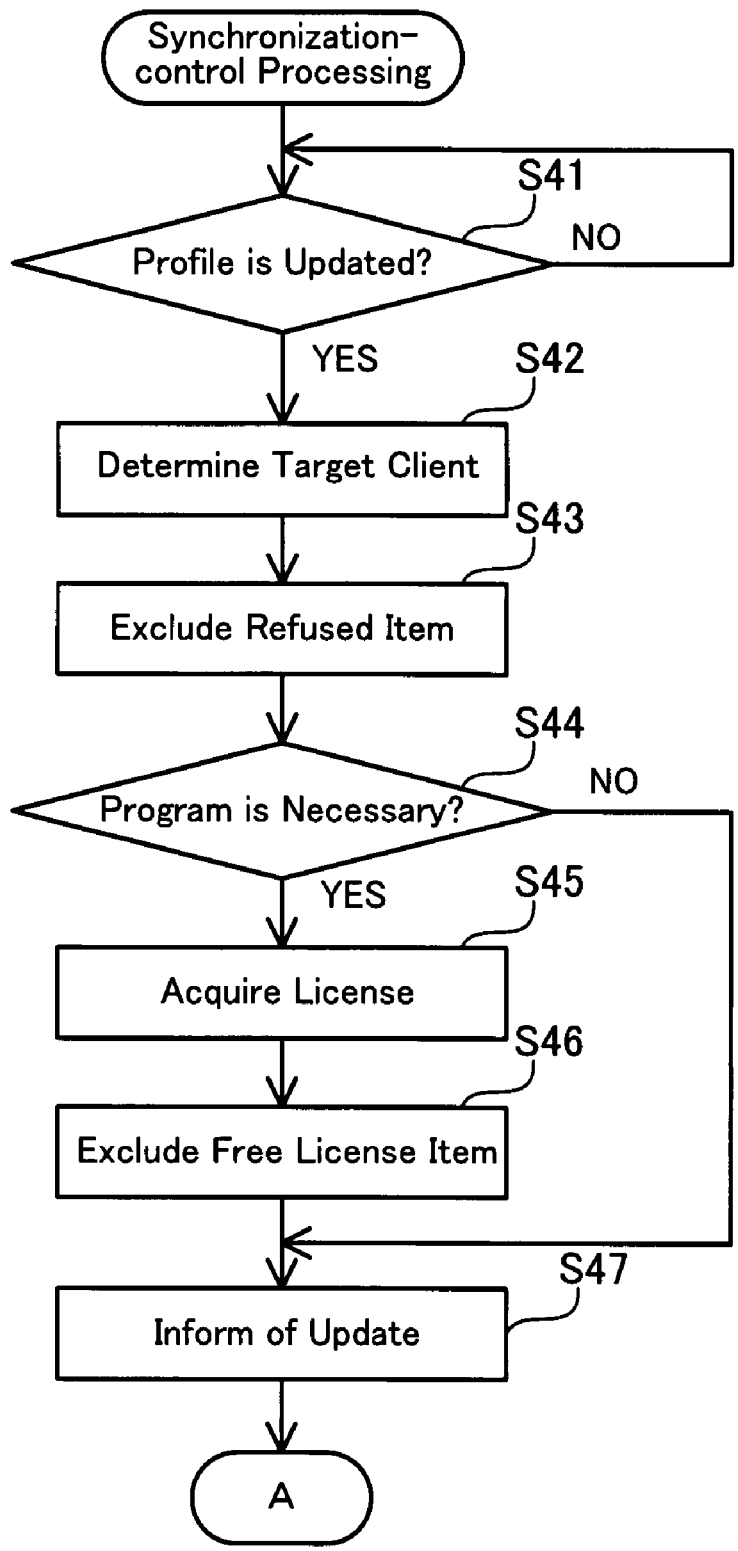
FIGS. 14 and 15 show a flow diagram indicating a sequence of synchronization-control processing.
Figure 15:
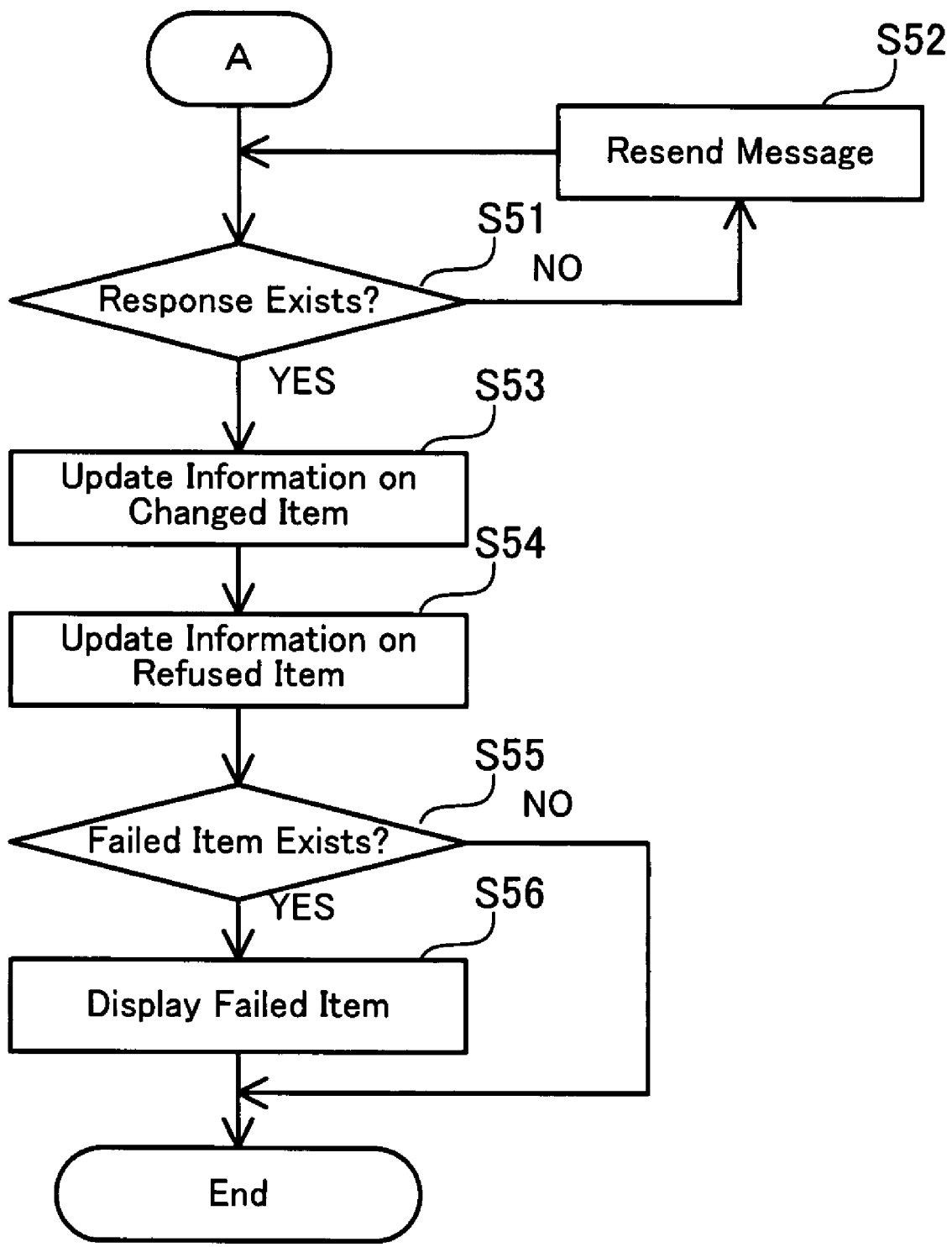

FIGS. 14 and 15 show a flow diagram indicating a sequence of synchronization-control processing. In the first half of the sequence indicated in FIG. 14, the management server 100 detects an update in the profile for the client 30, and sends a synchronization notice to the clients 30*a* and 30*b* which belong to the same group as the client 30. Only the processing which is performed when the management server 100 detects an update in the profile for the client 30 is explained below since similar processing is performed when the management server 100 detects an update in the profile for the client 30*a* or 30*b*. The processing indicated in FIG. 14 is explained below step by step.

<Step S41> The synchronized-object determination unit 180 monitors the setting-information table 120*a* stored in the profile storing unit 120, and determines whether or not the software-setting information in the setting-information table is updated. When yes is determined, the operation goes to step S42. When no is determined, the processing in step S41 is repeated after a predetermined time elapses.

<Step S42> Since the synchronized-object determination unit 180 detects an update in the setting-information table 120*a* in step S41, the synchronized-object determination unit 180 searches the group-information table 130*a* stored in the group-information storing unit 130, and determines that the clients 30*a* and 30*b* belonging to the same group as the client 30 are to be synchronized with the client 30.

<Step S43> The synchronized-object determination unit 180 searches the setting-information tables for the clients 30*a* and 30*b* (which are determined to be synchronized in step S42), and acquires software-setting information corresponding to the update detected in step S41. When a refusal record is contained as the remarks in the acquired software-setting information, the synchronized-object determination unit 180 excludes from the acquired software-setting information an update corresponding to the change the refusal of which is indicated in the refusal record. For example, when the refusal record indicates that the application "Mail X" installed in the client 30 is changed from the version "9.2" to "9.3", and the acquired software-setting information for the client 30*a* includes a refusal record indicating that a change in the application "Mail X" installed in the client 30*a* to the version "9.3" has been previously refused, the synchronized-object determination unit 180 excludes the client 30*a* from the objects to be synchronized, with respect to the refused change.

<Step S44> The synchronization control unit 190 acquires from the synchronized-object determination unit 180 information on the clients to be synchronized, and determines whether or not the change in the settings needs addition of one or more new programs. When yes is determined, the operation goes to step S45. When no is determined, the operation goes to step S47.

<Step S45> The synchronization control unit 190 searches the license-information table 140*a* stored in the program storing unit 140, and makes an attempt to acquire one or more licenses for the one or more programs the addition of which is determined in step S44 to be necessary. Specifically, the synchronization control unit 190 determines whether or not the addition of each of the one or more programs violates the license condition, and decrements the number of remaining licenses by one when the number of remaining licenses is stipulated. Then, the synchronization control unit 190 acquires a program file (and a license key when necessary) for each of the one or more programs for which the license is acquired.

<Step S46> The synchronization control unit 190 excludes, from the contents of a synchronization notice to be sent, a change in one or more settings requiring one or more programs for each of which the attempt to acquire a license fails in Step S45.

<Step S47> The synchronization control unit 190 sends the synchronization notice to the clients to be synchronized. The synchronization notice contains details of an instruction to change the settings. When one or more program files are acquired in step S45, the synchronization control unit 190 sends the one or more program files together with the synchronization notice.

The second half of the sequence of the synchronization-control processing indicated in FIG. 15 is performed after the management server 100 receives from the clients 30a and 30b acknowledgment responses to the synchronization notice. Although not indicated, similar processing to the sequence indicated in FIG. 15 is performed when the management server 100 receives an acknowledgment response from the client 30. The processing indicated in FIG. 15 is explained below step by step.

<Step S51> The synchronization control unit 190 determines whether or not the management server 100 receives acknowledgment responses from the clients 30a and 30b, to which the management server 100 has sent the synchronization notice within a predetermined time. When yes is determined, the operation goes to step S53. When no is determined, the operation goes to step S52.

<Step S52> The synchronization control unit 190 monitors the condition of communication with the clients 30a and 30b. Specifically, the synchronization control unit 190 periodically sends a message to the clients 30a and 30b, and determines whether or not communication is possible. When the synchronization control unit 190 determines that the communication becomes possible, the synchronization control unit 190 resends the synchronization notice, and thereafter the operation goes to step S51. Alternatively, the condition of communication may be monitored by the clients 30a and 30b, instead of the synchronization control unit 190. In this case, when the communication becomes possible, the clients 30a and 30b inform the management server 100.

<Step S53> When at least one of the acknowledgment responses received in step S51 indicates setting items the change of which succeeds, the synchronization control unit 190 updates the software-setting information in one or more setting-information tables for the at least one of the acknowledgment responses with the change in the setting items.

<Step S54> When the acknowledgment response received in step S51 indicates setting items the change of which is refused, the synchronization control unit 190 writes the refused change in the setting items (as one or more refusal records) in the "Remarks" field in each of one or more setting-information tables for the at least one of the acknowledgment responses.

<Step S55> The synchronization control unit 190 determines whether or not the synchronization fails in one or more setting items. The failure in the synchronization can be caused by, for example, the exclusion from the synchronization notice due to lack of license, or refusal of a change in the software-setting information by a client. When the synchronization fails in one or more setting items, the operation goes to step S56. When the synchronization succeeds in all the setting items required to be changed, the synchronization-control processing indicated in FIGS. 14 and 15 is completed.

<Step S56>. The synchronization control unit 190 sends a report of the failure to the client 30 which has sent the change notice initiating the sequence of changing the settings so that the report is displayed on a display device belonging to the client 30. The report of the failure contains information on one or more clients and one or more setting items for which the synchronization fails.

As described above, when the management server 100 detects an update of the profile for the client 30, the management server 100 sends a synchronization notice to the clients 30a and 30b, which belong to the same group as the client 30 (for which the profile is updated). When the change in the settings needs addition of one or more new programs, and the addition of the one or more programs does not violate the license condition, the management server 100 sends to the clients 30a and 30b the one or more program files together with the synchronization notice. In addition, the management server 100 updates the profiles for the clients 30a and 30b on receipt of the acknowledgment responses from the clients 30a and 30b. Further, when synchronization fails in one or more setting items, the management server 100 sends a report of the failure to the client 30 and makes the client 30 display the report.

Figure 16:
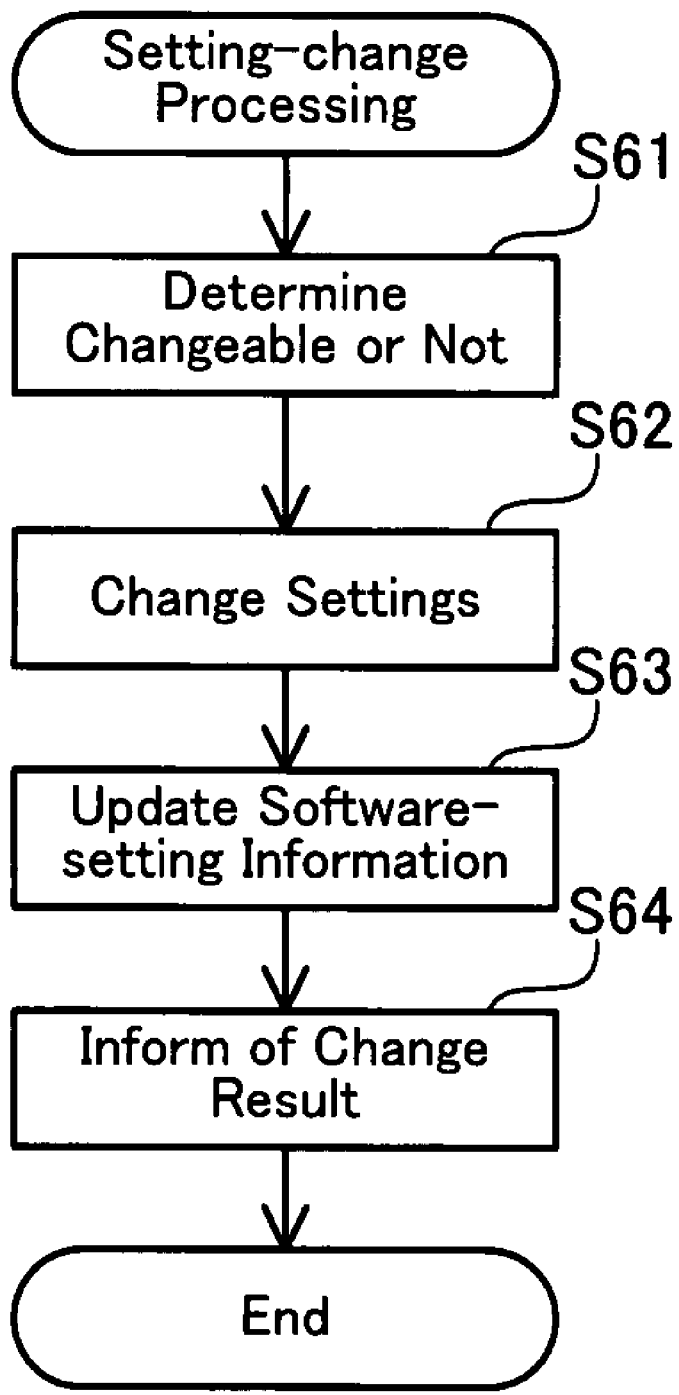
FIG. 16 is a flow diagram indicating a sequence of setting-change processing.

FIG. 16 is a flow diagram indicating a sequence of setting-change processing. In the sequence of FIG. 16, the client 30 receives a synchronization notice from the management server 100, and changes the settings in the client 30. Only the processing which is performed when the client 30 receives a synchronization notice is explained below since similar processing is performed when the client 30a or 30b receives a synchronization notice. The processing indicated in FIG. 16 is explained below step by step.

<Step S61> When the client 30 receives a synchronization notice, the setting change unit 34 determines whether or not the client 30 can change the respective settings indicated in the synchronization notice. For example, the setting change unit 34 refers to the software-setting information stored in the setting-information storing unit 31, and determines that the client 30 cannot change the respective settings indicated in the synchronization notice when the change causes a contradiction with other settings.

<Step S62> The setting change unit 34 changes the settings which are determined in step S61 to be able to be changed.

<Step S63> The setting change unit 34 reflects the result of the change made in step S62, in the software-setting information stored in the setting-information storing unit 31.

<Step S64> The setting change unit 34 returns an acknowledgment response to the management server 100. The acknowledgment response contains the settings which are changed in step S62 and/or the settings the change of which is rejected.

As described above, when the client 30 receives a synchronization notice from the management server 100, the client 30 determines the settings which can be changed and the settings which cannot be changed, and changes the settings which can be changed. Then, the client 30 reports the result of the change to the management server 100.

Figure 17:
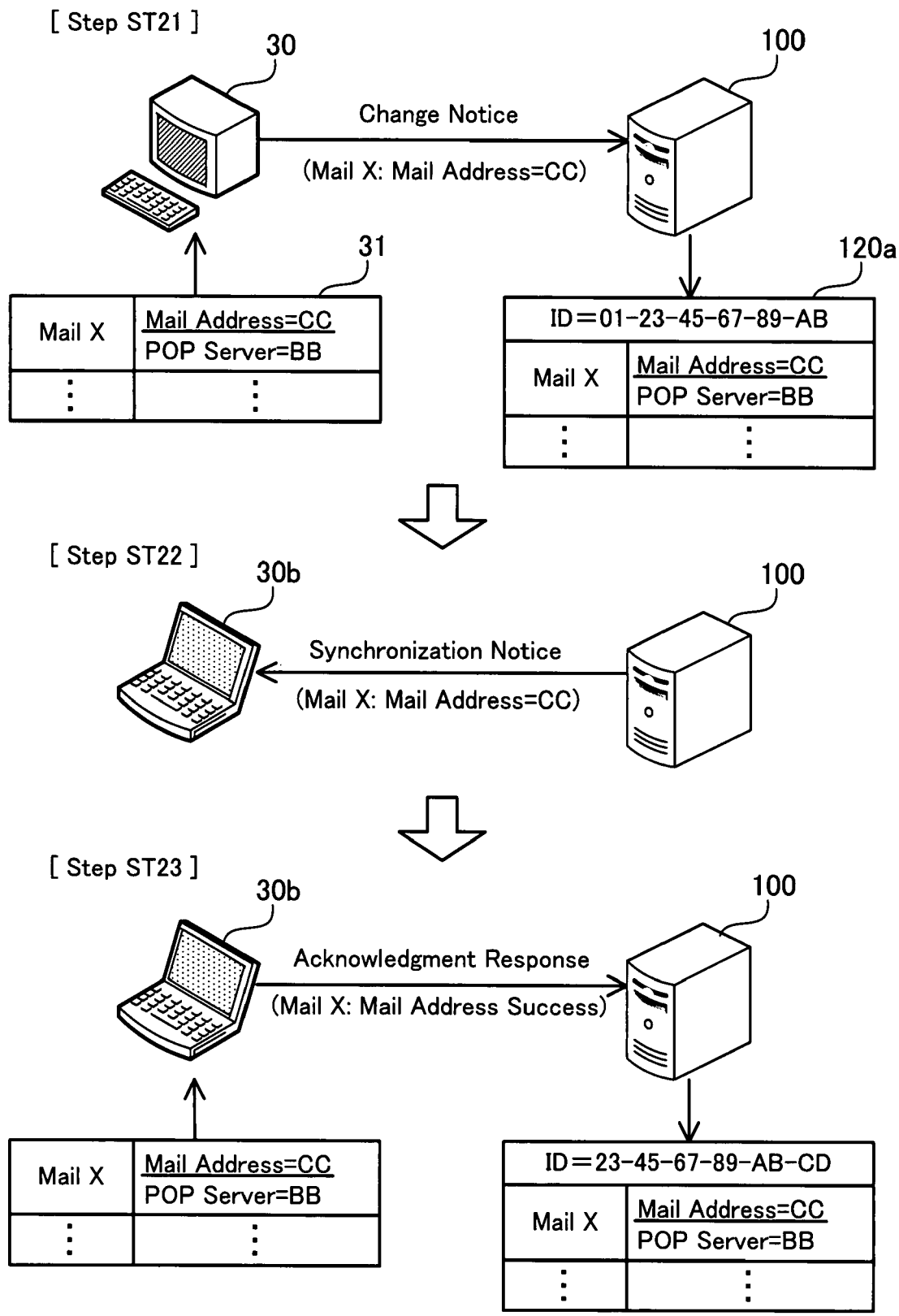
FIG. 17 is a schematic diagram indicating examples of the synchronization-control processing and the setting-change processing.

FIG. 17 is a schematic diagram indicating examples of the synchronization-control processing and the setting-change processing.

In step ST21, when the client 30 detects a change in the setting item "Mail Address" in the application "Mail X," the network 20 sends a change notice to the management server 100. When the management server 100 receives the change notice from the client 30, the management server 100 updates the setting-information table 120a for the client 30.

In step ST22, when the management server 100 detects an update of the setting-information table 120a, the management server 100 sends a synchronization notice to the clients 30a and 30b (which belong to the same group as the client 30), although transmission of the synchronization notice to the client 30a is not shown in FIG. 17).

In step ST23, when the client 30b receives the synchronization notice, the client 30b changes the settings in the setting item "Mail Address" of the application "Mail X," and sends to the management server 100 an acknowledgment response indicating the completion of the change in the settings in the setting item "Mail Address." Then, the management server 100 updates the setting-information table for the client 30b.

Advantages

As explained above, the software management apparatus according to the present invention holds group information defining one or more groups each constituted by one or more clients. When the software management apparatus receives a change notice from a client, the software management apparatus updates a profile for the client, and then sends a synchronization notice to the other clients belonging to the same group as the above client. Therefore, the software management apparatus can simultaneously change the settings in all the clients belonging to the same group when the settings of software in one client belonging to the group are changed. Thus, according to the present invention, it is possible to flexibly and easily manage the settings of software even in a system in which a plurality of clients are concurrently used.

In particular, the management server 100 according to the present embodiment has the following advantages.

(1) Even in the case where a client required to be synchronized is not started up or a temporal trouble occurs in a communication path between the management server 100 and a client, it is possible to automatically start the synchronization processing immediately when the communication between the management server 100 and the client becomes possible, and therefore prevent omission of a client during the operation of changing the settings.

(2) Since a report of a failure in a change in settings is displayed immediately when the failure occurs, it is possible to prevent the user from having a misunderstanding that all the settings in all the clients indicated by the synchronization notice have been changed.

(3) It is possible to stop sending to a client a notice which designates the same type of setting change as a setting change which has been previously refused by the client, and therefore prevent useless processing and communication.

(4) It is possible to designate one or more setting items to be synchronized, for each type of software, and automatically collect software-setting information for the one or more setting items when profiles are registered.

(5) It is possible to automatize installation of a new program or updating of a program.

(6) It is possible to manage license information for applications in a centralized manner, prevent loss of license information, and prevent installation or updating of a program which violates a license.

(7) Although the management server 100 is used in the case where a single user manages a plurality of personal computers according to the embodiment explained above, alternatively, it is possible to use the management server 100 for managing computers which constitute a grid computer. Grid computing is a technique of interconnecting a great number of computers through a network so as to realize a computer which can perform a great number of operations in parallel. In some cases, the administrator of the grid computer needs to simultaneously change the settings in the computers constituting the grid computer. However, the number of the computers constituting the grid computer is great, conventionally, the operation for changing the settings in the computers imposes a heavy burden on the administrator. When the management server 100 according to the present embodiment is used for managing the computers constituting the grid computer, it is possible to greatly reduce the burden imposed on the administrator. The effect of reducing the burden imposed on the administrator is more enhanced when the number of the computers constituting the grid computer is greater.

Recording Medium Storing Program

The processing functions of the management server 100 according to the present embodiment which are explained above can be realized by a computer. In this case, a program describing details of processing for realizing the functions which the management server 100 should have is provided. When the computer executes the program, the processing functions of the management server 100 can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

Additional Matter

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A software management process for managing software installed in a plurality of client apparatuses, the software management process being executed by a computer, comprising:

(a) receiving from a first client apparatus among the plurality of client apparatuses a first change notice and updating a first profile for a first client apparatus among a plurality of profiles for the plurality of client apparatuses in accordance with the first change notice, where the plurality of profiles are respectively stored and respectively contain information on settings of said software installed in the plurality of client apparatuses, the first change notice indicating that the settings of said software installed in the first client apparatus are changed by the first client apparatus;

(b) referring to group information, which is stored and defines one or more groups each including one or more of said plurality of client apparatuses, and determining one or more second client apparatuses which belong to a same group as the first client apparatus, when the first profile is updated;

(c) sending to said one or more second client apparatuses a first synchronization notice indicating that a first change of the settings indicated by the first change notice is to be reflected in the one or more second client apparatuses;

(d) adding, when receiving from a second client apparatus among said one or more second client apparatuses a response indicating refusal of the first change of the settings, to a second profile for the second client apparatus a refusal record indicating the refusal of the first change of the settings; and (e) omitting, when receiving a second change notice indicating a second change of the settings which is a same type as the first change of the settings, the second client apparatus from destinations of a second synchronization notice indicating that the second change of the settings is to be reflected, in accordance with the refusal record added to the second profile.

2. The software management process according to claim 1, wherein when a response indicating acknowledgment of the first change of the settings is received from another second client apparatus among said one or more second client apparatuses, another second profile for said another second client apparatus is updated in accordance with the acknowledgment.

3. The software management process according to claim 2, wherein when a failure occurs in communication with the one or more second client apparatuses in said (c), said one or more second client apparatuses are continuously monitored after the failure, and said first synchronization notice is sent to the one or more second client apparatuses when the communication with the one or more second client apparatuses becomes possible.

4. The software management process according to claim 2, wherein when the response indicating the refusal is received from the second client apparatus, a report of a failure in synchronization is displayed on a display device.

5. The software management process according to claim 1, further comprising, (f) when a registration request designating a type of software is received from one of said plurality of client apparatuses before the (a), referring to an item list indicating one or more setting items which are to be included in said plurality of profiles for each type of software, and sending an item list for said type of software designated by said registration request to said one of said plurality of client apparatuses, and (g) when information on settings corresponding to said item list for said type of software designated by said registration request is received from said one of the plurality of client apparatuses after the (f), producing one of said plurality of profiles for the one of the plurality of client apparatuses on a basis of the information on the settings corresponding to the item list for the type of software designated by the registration request, and storing the produced one of the plurality of profiles.

6. A software management apparatus for managing software installed in a plurality of clients, comprising:

a storage which stores a plurality of profiles for the plurality of clients, where each of the plurality of profiles contains information on settings of said software installed in one of the plurality of clients corresponding to said each of the plurality of profiles, and stores group information defining one or more groups each including one or more of said plurality of clients; and a processor configured to perform a procedure comprising:
receiving from a first client among the plurality of clients a first change notice and updating a first profile for the first client among the plurality of profiles in accordance with the first change notice, the first change notice indicating that the settings of said software installed in the first client are changed by the first client;

referring to the storage, and determining one or more second clients belonging to a same group as the first client when the first profile is updated;

sending to said one or more second clients a first synchronization notice indicating that a first change of the settings indicated by the first change notice is to be reflected in the one or more second clients;

adding, when receiving from a second client among said one or more second clients a response indicating refusal of the first change of the settings, to a second profile for the second client a refusal record indicating the refusal of the first change of the settings; and omitting, when receiving a second change notice indicating a second change of the settings which is a same type as the first change of the settings, the second client from destinations of a second synchronization notice indicating that the second change of the settings is to be reflected, in accordance with the refusal record added to the second profile.

7. The software management apparatus according to claim 6, wherein when the software management apparatus receives from another second client among said one or more second clients a response indicating acknowledgment of the first change of the settings, the processor updates another second profile for said another second client in accordance with the acknowledgment.

8. The software management apparatus according to claim 7, wherein the processor starts continuous monitoring of said one or more second clients when the processor fails in communication with the one or more second clients, and sends the first synchronization notice to the one or more second clients when the processor detects that communication with the one or more second clients becomes possible.

9. The software management apparatus according to claim 7, wherein when said software management apparatus receives from the second client the response indicating the refusal, the processor displays in a display device a report of a failure in synchronization.

10. The software management apparatus according to claim 6, wherein:
the storage stores, for each type of software, an item list indicating one or more setting items which are to be included in said plurality of profiles, and
the procedure further comprises referring to the storage and sending to one of said plurality of clients an item list for a type of software designated by a registration request when the software management apparatus receives from the one of said plurality of clients the registration request designating the type of software, and thereafter producing one of said plurality of profiles for the one of the plurality of clients on a basis of information on settings corresponding to said item list for the type of software designated by the registration request and storing the produced one of the plurality of profiles in the storage when the software management apparatus receives from the one of the plurality of clients the information on settings corresponding to said item list for the type of software designated by the registration request.

11. A computer-readable, non-transitory medium storing a software management program for managing software installed in a plurality of clients, the software management program causing a computer to perform a method comprising:
receiving from a first client among the plurality of clients a first change notice and updating a first profile for the first client among a plurality of profiles for the plurality of clients in accordance with the first change notice, the plurality of profiles being stored in a storage and containing information on settings of said software in the plurality of clients, the first change notice indicating that the settings of said software installed in the first client are changed by the first client;
referring to group information which is stored in the storage and defines one or more groups each including one or more of the plurality of clients, and determining one or more second clients belonging to a same group as the first client, when the first profile is updated;
sending to said one or more second clients a first synchronization notice indicating that a first change of the settings indicated by the first change notice is to be reflected in the one or more second clients;
adding, when receiving from a second client among said one or more second clients a response indicating refusal of the first change of the settings, to a second profile for the second client a refusal record indicating the refusal of the first change of the settings; and
omitting, when receiving a second change notice indicating a second change of the settings which is a same type as the first change of the settings, the second client from destinations of a second synchronization notice indicating that the second change of the settings is to be reflected, in accordance with the refusal record added to the second profile.

12. The computer-readable, non-transitory medium according to claim 11, wherein when the computer receives from another second client among said one or more second clients a response indicating acknowledgment of the first change of the settings, the computer updates another second profile for said another second client in accordance with the acknowledgment.

13. The computer-readable, non-transitory medium according to claim 12, wherein the computer starts continuous monitoring of said one or more second clients when the computer fails in communication with the one or more second clients, and sends the first synchronization notice to the one or more second clients when the computer detects that communication with the one or more second clients becomes possible.

14. The computer-readable, non-transitory medium according to claim 12, wherein when the computer receives from the second client the response indicating the refusal, the computer displays in a display device a report of a failure in synchronization.

15. The computer-readable, non-transitory medium according to claim 11, wherein:
the storage stores, for each type of software, an item list indicating one or more setting items which are to be included in said plurality of profiles, and
the method further comprises referring to the storage and sending to one of said plurality of clients an item list for a type of software designated by a registration request when the computer receives from the one of said plurality of clients the registration request designating the type of software, and thereafter producing one of said plurality of profiles for the one of the plurality of clients on a basis of information on settings corresponding to said item list for the type of software designated by the registration request and storing the produced one of the plurality of profiles in the storage when the computer receives from the one of the plurality of clients the information on settings corresponding to said item list for the type of software designated by the registration request.

16. The computer-readable, non-transitory medium according to claim 11, wherein the storage stores one or more files necessary for execution of said software, and the computer acquires from the storage a file and sends the file together with said first synchronization notice to said one or more second clients when the first change of the settings indicated by the first synchronization notice includes addition of said file.

17. The computer-readable, non-transitory medium according to claim 16, wherein the storage stores information on a license for said software, and the computer refers to the information on the license when the computer acquires said file from the storage, and sends the file together with said first synchronization notice to each of said one or more second clients only when said addition of the file in said each of the one or more second clients does not violate the license.

* * * * *